United States Patent
Cioc et al.

(10) Patent No.: US 10,066,679 B2
(45) Date of Patent: Sep. 4, 2018

(54) SELECTABLE ONE-WAY CLUTCH APPARATUS

(71) Applicant: Magna Powertrain Inc., Concord (CA)

(72) Inventors: Adrian C. Cioc, Richmond Hill (CA); Darrell F. Greene, Bradford (CA); David V. Dorigo, Concord (CA); Sean A. Steele, Mississuaga (CA)

(73) Assignee: MAGNA POWERTRAIN INC., Concord (CA)

( * ) Notice: Subject to any disclaimer, the term of this patent is extended or adjusted under 35 U.S.C. 154(b) by 85 days.

(21) Appl. No.: 15/115,972

(22) PCT Filed: Feb. 27, 2015

(86) PCT No.: PCT/CA2015/000127
§ 371 (c)(1),
(2) Date: Aug. 2, 2016

(87) PCT Pub. No.: WO2015/127546
PCT Pub. Date: Sep. 3, 2015

(65) Prior Publication Data
US 2017/0138414 A1    May 18, 2017

Related U.S. Application Data

(60) Provisional application No. 61/946,345, filed on Feb. 28, 2014.

(51) Int. Cl.
*F16D 27/09* (2006.01)
*F16D 41/12* (2006.01)

(52) U.S. Cl.
CPC .......... *F16D 27/09* (2013.01); *F16D 41/125* (2013.01)

(58) Field of Classification Search
CPC .............................. F16D 27/09; F16D 41/125
See application file for complete search history.

(56) References Cited

U.S. PATENT DOCUMENTS

| 6,290,044 B1 | 9/2001 | Burgman et al. |
| 7,766,790 B2 | 8/2010 | Stevenson et al. |

(Continued)

FOREIGN PATENT DOCUMENTS

| CN | 101096982 A | 1/2008 |
| CN | 101240820 A | 8/2008 |

(Continued)

OTHER PUBLICATIONS

Definition of "engaged" retrieved from www.merriamwebster.com on Jan. 18, 2018.*

(Continued)

*Primary Examiner* — Stacey A Fluhart
(74) *Attorney, Agent, or Firm* — Dickinson Wright PLLC

(57) ABSTRACT

A selectable one-way clutch apparatus. The one-way clutch apparatus includes a first plate that has an inner surface that defines at least one compartment. A second plate has a ratchet surface aligned axially adjacent with the inner surface of the first plate and presents a plurality of teeth. Each of the compartments is divided into a strut section, an armature section and a core section. At least one electromagnetic actuator unit is received by the compartment. The electromagnetic actuator unit includes a coil assembly, an armature assembly that has at least one armature finger pivotally moveable in the armature section for movement toward and away from the coil assembly in response to the coil assembly being energized, and at least one strut that is pivotally moveable in the strut section for moving in response to engagement by the armature finger between a locked position and a released position.

12 Claims, 8 Drawing Sheets

(56) References Cited

U.S. PATENT DOCUMENTS

| | | |
|---|---|---|
| 8,079,453 B2 | 12/2011 | Kimes |
| 8,276,725 B2 | 10/2012 | Swales et al. |
| 8,403,123 B2 | 3/2013 | Bird et al. |
| 8,418,825 B2 | 4/2013 | Bird |
| 8,491,439 B2 | 7/2013 | Kimes |
| 2006/0237276 A1* | 10/2006 | Jegatheeson ............ F16D 41/30 192/46 |
| 2008/0169165 A1 | 7/2008 | Samie et al. |
| 2012/0103745 A1 | 5/2012 | Bird |
| 2012/0103747 A1 | 5/2012 | Bird |
| 2012/0145505 A1 | 6/2012 | Kimes |
| 2013/0319812 A1 | 12/2013 | Wys et al. |
| 2014/0102844 A1* | 4/2014 | Greene ................... F16D 41/16 192/45.1 |
| 2014/0284167 A1* | 9/2014 | Kimes .................... F16D 27/09 192/84.92 |
| 2014/0305761 A1 | 10/2014 | Kimes |
| 2015/0060225 A1* | 3/2015 | Kimes .................... F16D 27/02 192/69 |

FOREIGN PATENT DOCUMENTS

| | | |
|---|---|---|
| CN | 103299098 A | 9/2013 |
| WO | WO2015013802 A1 | 2/2015 |

OTHER PUBLICATIONS

International Search Report and Written Opinion dated May 13, 2015 from International Patent Application No. PCT/CA2015/00127.

Search Report dated Jan. 2, 2018 by the State Intellectual Property Office in corresponding Chinese Patent Application No. 201580010548.7.

\* cited by examiner

SELECTABLE ONE-WAY CLUTCH APPARATUS

CROSS REFERENCE TO RELATED APPLICATION

This application claims priority to and the benefit of U.S. Provisional Patent Application Ser. No. 61/946,345 filed on Feb. 28, 2014, entitled "METHODOLOGY OF ACTUATING AN OVERRUNNING CLUTCH/RADIAL AND AXIAL ACTUATORS", The entire disclosure of the above application is incorporated herein by reference.

BACKGROUND OF THE INVENTION

1. Field of the Invention

The present disclosure relates generally to overrunning coupling devices such as one-way clutches and, more specifically, to electromechanically-actuated one-way clutches.

2. Related Art

This section provides background information related to the present disclosure which is not necessarily prior art.

Automatic transmissions provide a plurality of forward and reverse speed or gear ratios by selectively actuating one or more brakes or clutches. One type of brake or clutch widely used in modern automatic transmissions is a one-way clutch (OWC) which overrun when one of its races (in radial clutch arrangement) or one of its drive plates (in axial clutch arrangements) rotates in a first (i.e., freewheel) direction relative to the other race or drive plate, and it engages or locks in a second (i.e., lockup) direction. Such conventional overrunning coupling devices provide no independent control over their operation, that is to say whether they lockup or freewheel in both directions. Thus, basic one-way clutches provide a "locked" mode in one rotary direction and a "freewheel" mode in the opposite rotary direction based an the direction that a torque is being applied to the input member.

There are however, requirements in automatic transmissions where "controllable" overrunning coupling devices, commonly referred to as selectable one-way clutches (SOWC), are selectively controlled to provide additional functions. Specifically, a selectable one-way clutch may further be capable of producing a freewheel mode in both directions until a command causes the clutch to shift into its lockup mode. Thus, a selectable one-way clutch may be capable of providing a drive connection between an input member and an output member in one or both rotational directions and may also be operable to freewheel in one or both rotational directions.

In some instances, the SOWC in automatic transmissions often utilizes a high pressure hydraulic control system to selectively actuate the clutch and shift between the available operating modes. Examples of conventional selectable one-way clutches that are hydraulically controlled are disclosed in U.S. Pat. Nos. 8,079,453 and 8,491,439. In contrast, it is also known to provide an electromechanical actuator for the SOWC, examples of which are disclosed in U.S. Pat. Nos. 8,276,725 and 8,418,825. While such selectable one-way clutch configurations appear to meet all functional requirements, a need exists to continue development of new and improved selectable one-way clutches, especially the type that do not require high pressure hydraulics for actuation.

SUMMARY

This section provides a general summary of disclosure and is not a comprehensive disclosure of its full scope or all of its aspects and features.

In one aspect of the present disclosure, a selectable one-way clutch is provided that is configured as an axial clutch and which has an electromagnetic clutch actuation system.

The selectable one-way clutch includes a first plate that extends along an axis and has an inner surface that defines at least one compartment. Further, a second plate is provided that has a ratchet surface that is aligned axially adjacent with the inner surface of the first plate and presents a plurality of teeth. Each of the compartments are divided into a strut section, an armature section and a core section, with the core section disposed between the strut and armature sections. At least one electromagnetic actuator unit is received by the compartment. The electromagnetic actuator unit includes at least one coil assembly that is disposed in the core section, at least one armature assembly that has at least one armature finger pivotally moveable in the armature section and extending over the coil section for movement toward and away from the coil in response to the coil being energized, and at least one strut that is pivotally moveable in the strut section for moving in response to engagement by the armature finger between a locked position engaging one of the teeth and a released position displaced from engagement with the teeth.

Thus, the axial selectable one-way clutch of the present disclosure is configured to provide the first plate with a plurality of compartments. Each compartment is configured to locate and position the coil assembly and armature to define a desired space or air gap, as well as to pivotally support the strut and positively locate a biasing member against the strut.

The present disclosure may alternatively be configured to provide a plurality of compartments m the first plate each having an integral core segment on which the coil assembly is supported.

The present disclosure may further define a SOWC having a combined common armature plate, and an annular coil unit that is mounted in an annular groove in the first plate.

Further areas of applicability will become apparent from the description provided herein. The description and specific examples in this summary are not intended to limit the scope of the inventive concepts disclosed herein.

DRAWINGS

The drawings described herein are for illustrative purposes only of selected embodiments and are not intended to limit the scope of the present disclosure. The inventive concepts will be more readily understood by reference to the following description in combination with, the accompanying drawings where:

Figure 10:
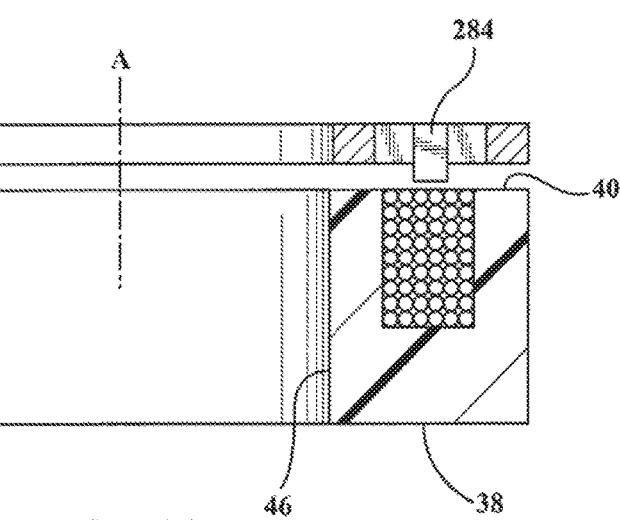
Figure 11:
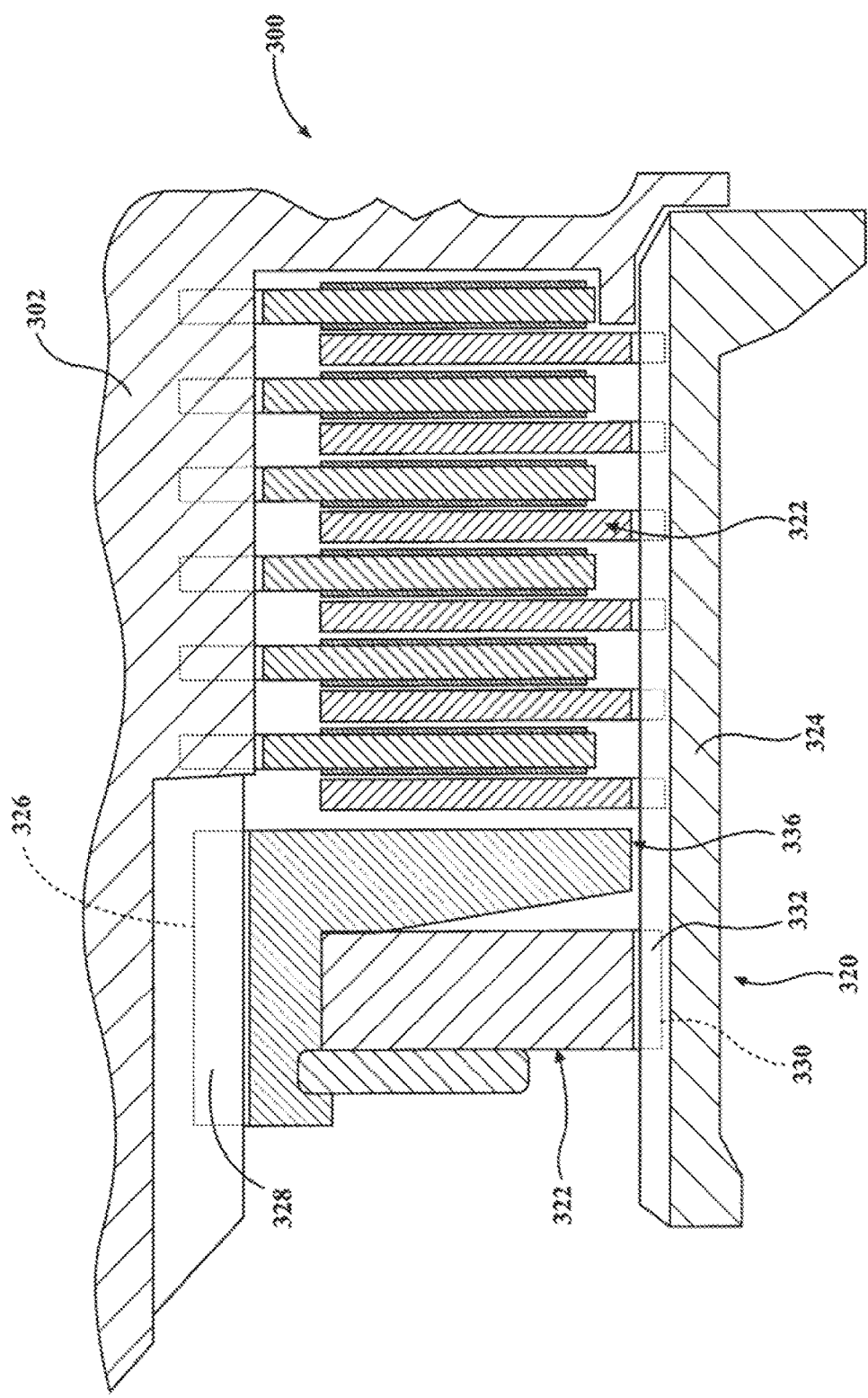

FIG. 10 illustrates an axial type selectable one-way clutch having the one-piece common armature plate in association with a coil assembly that is retained in an annular groove formed in the planar face of the pocket plate; and FIG. 11 illustrates an exemplary placement of any one of the axial type selectable one-way clutches of the present disclosure assembled into a portion of an automatic transmission.

DESCRIPTION OF THE ENABLING EMBODIMENT

Example embodiments will now be described more fully with reference to the accompanying drawings. Each of the example embodiments is directed to an electromagnetically-actuated overrunning coupling device, hereinafter referred to as a selectable one-way clutch (SOWC). In general, each example embodiment employs one or more electromagnetic actuator units in an axial or planar type of SOWC which advances the technology over conventional SOWC products. However, the example embodiments only are provided so that this disclosure will be thorough, and will fully convey the scope to those who are skilled in the art. Numerous specific details are set forth such as examples of specific components, devices, and methods, to pro vide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The present disclosure is generally related to electromechanical rocker clutches that function to transmit torque mechanically but which are actuated via electrical actuation/controls. When a voltage and/or current is applied to an electromagnetic coil assembly or coil assemblies, the coil assembly becomes an electromagnet and produces a magnetic field. The magnetic flux flows around a magnetic circuit established between the components and is transferred across a small air gap between a moveable armature and a core associated with the coil assembly. Magnetization of the core functions to attract the armature toward the core for moving the armature from a first or "non-actuated" position toward a second or "actuated" position. The resulting movement of the armature from its first position to its second position causes a locking member, commonly referred to as a strut, to move from a first or "released" position, toward a second or "locked" position based on a linkage type connection between the strut and armature. The coil assembly, the armature, and the strut define an electromagnetic actuator unit that is mounted to a pocket plate, i.e., a first plate member.

Movement of the strut to its locked position causes a locking edge, i.e., locking segment, of the strut to engage one of a plurality of locking teeth associated with a second plate member, thereby coupling the first plate member to the second plate member for rotation together or against rotation in a certain rotational direction. Disengagement occurs as the voltage and/or current is removed from the coil assembly such that the armature is demagnetized and freed from attraction toward the core of the coil assembly. As such, a spring, or other biasing member, is permitted to forcibly urge the strut to pivot from its locked position back to its released position which, in turn, causes the armature to move from its actuated position to its non-actuated position.

Figure 1:
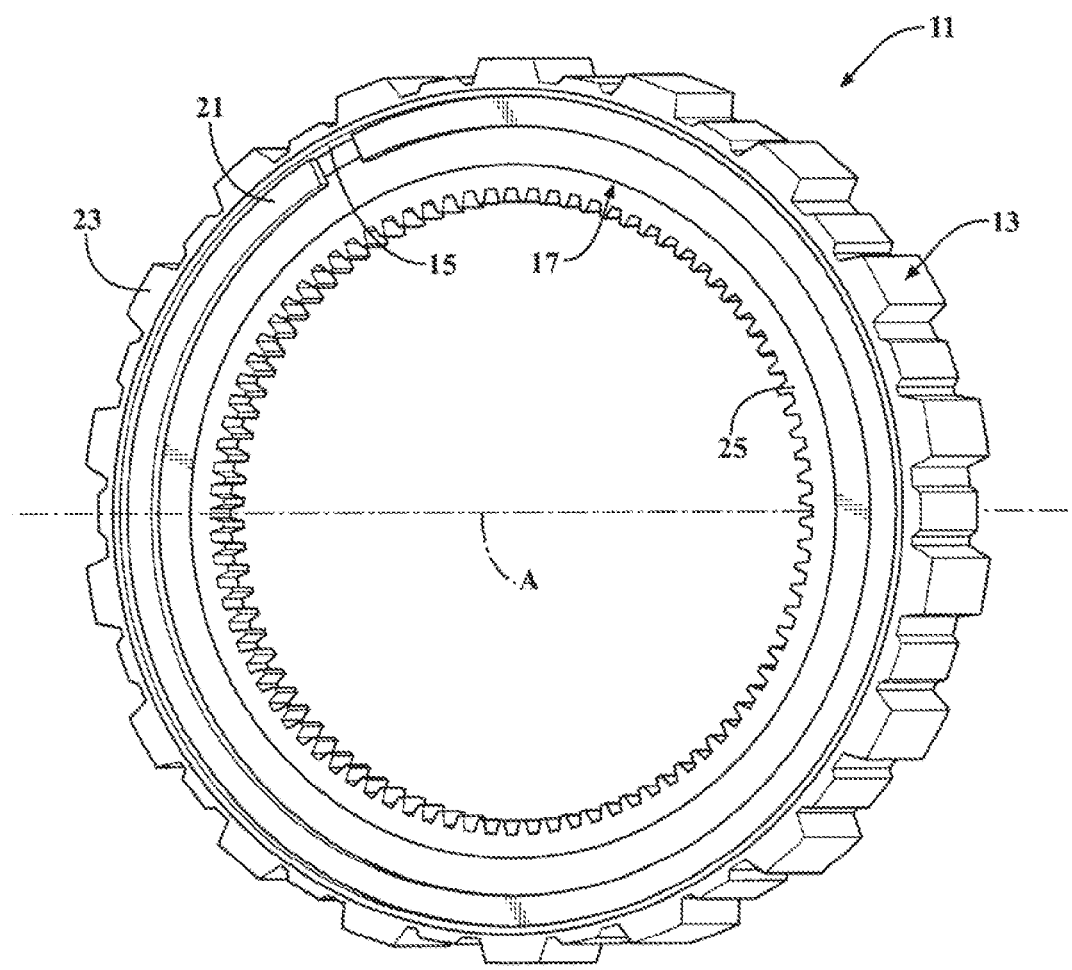
FIG. 1 is a perspective view of an electromechanically-actuated overrunning coupling, hereinafter referred to as a selectable one-way clutch, of the axial type and to which the present disclosure is directed.

FIG. 1 is provided to illustrate a general configuration for an axial or planar type of selectable one-way clutch 11 of the type adapted for use in power transfer applications, and in particular for use in automatic transmissions for motor vehicles. Selectable one-way clutch 11 generally includes a first plate member 13 defining an annular chamber 15 within which a second plate member 17 is rotatably disposed. Both first plate member 13 and second plate member 17 axe aligned concentrically relative to an axis A. A snap ring 21 is provided for retaining second plate member 17 within chamber 15 of first plate member 13. First plate member 13 will hereinafter be referred to as a pocket plate and is shown to include a plurality of external spline teeth or lugs 23 that are adapted to mate with internal spline teeth or lugs (not shown) of a first component. The first component can be a stationary component (such as a housing of a transmission) or a rotary component (such as a shaft) depending on the specific application to which the selectable one-way clutch 11 is utilized. Likewise, second plate member 17 will hereinafter be referred to as a lock plate and is shown to include a plurality of internal spline teeth 25 that are adapted to mate with external splines (not shown) of a second component which typically is a rotary component. If will be appreciated that lock plate 17 and pocket plate 13 do not need to be "nested" as shown in FIG. 1 to provide an axial type clutch arrangement and can, for example, simply be located axially adjacent to one another.

Figure 2:
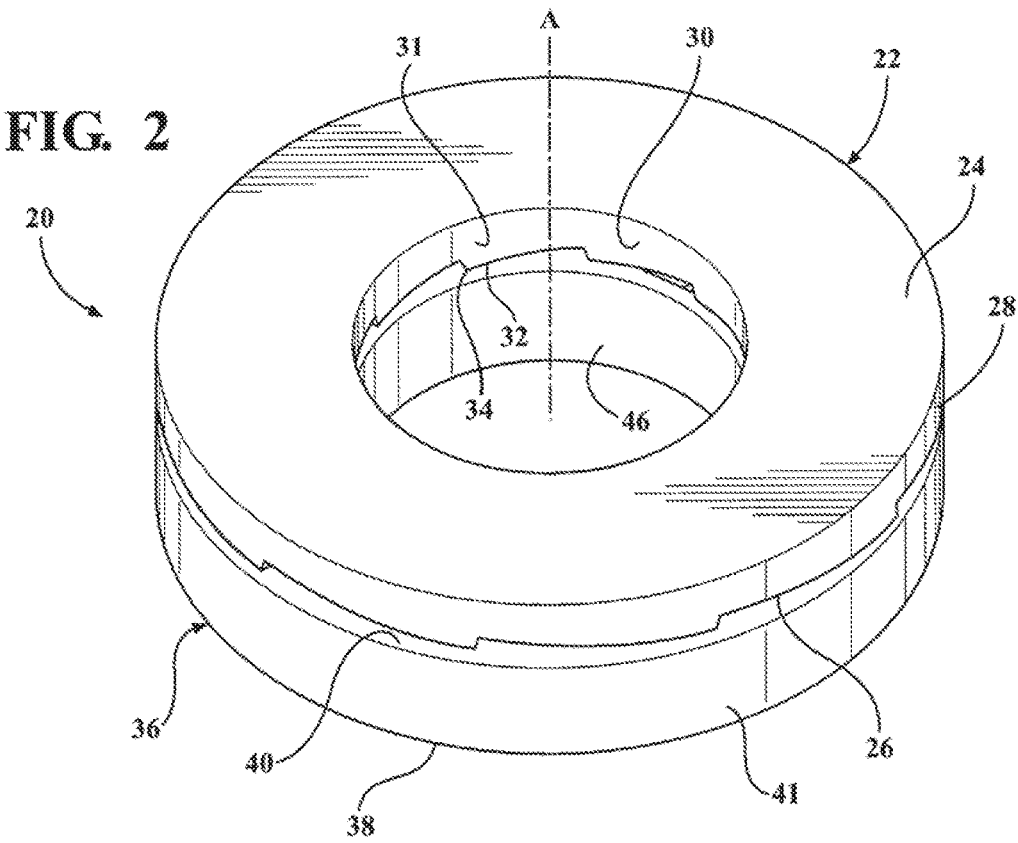
FIG. 2 is a perspective view of an axial type selectable one-way clutch constructed in accordance with the teachings of the present invention and including a first or pocket plate, a second or lock plate, and a plurality of electromagnetic actuator units.
Figure 3:
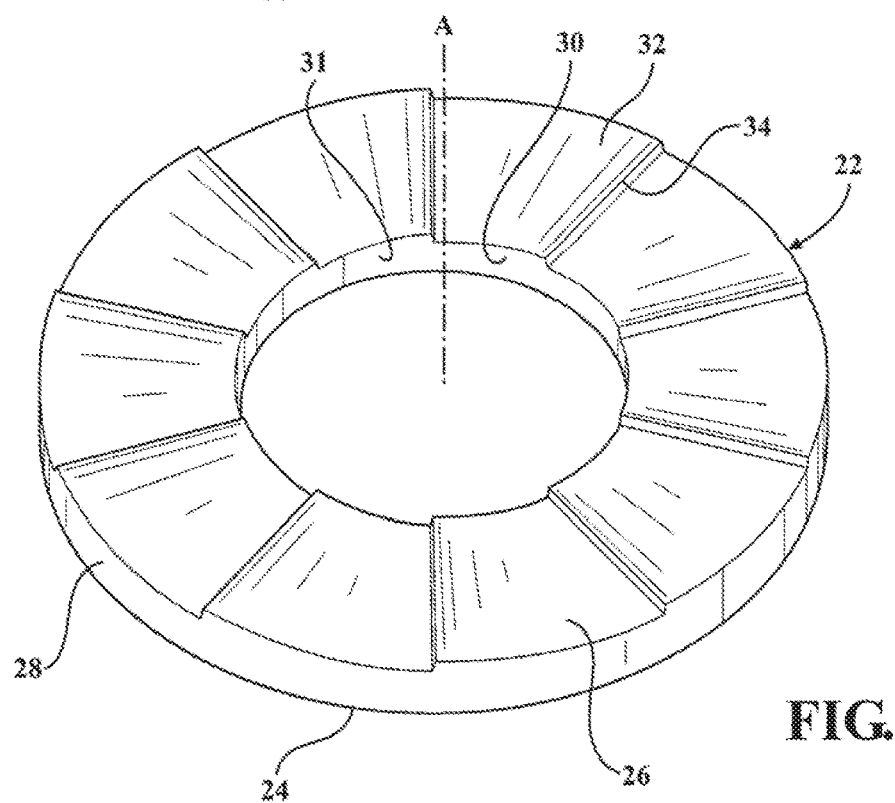
FIG. 3 is a perspective view of the lock plate showing the locking tooth and shoulder profile of its locking surface in greater detail.

Referring now to FIG. 2, an example construction is generally shown for a selectable one-way clutch apparatus 20 in a side-by-side arrangement of a first plate, i.e., pocket plate 36, and a second plate, i.e., a lock plate 22. As best shown in FIG. 3, the lock, plate 22 has a generally cylindrical-shape and extends along an axis A between a planar outside surface 24 and a non-planar ratchet surface 26, A side wall 28 extends between the outside and ratchet surfaces 24, 26. The lock plate 22 further defines a hole 30 that extends through the lock plate 22 along the axis A and along an inside wall 31 between the outside and ratchet surfaces 24, 26. A plurality of teeth 32 extend from the ratchet surface 26 and are evenly and continuously distributed about the hole 30. Each of the teeth 32 presents a shoulder 34 that extends radially between the side wall 28 and the hole 30.

Figure 4:
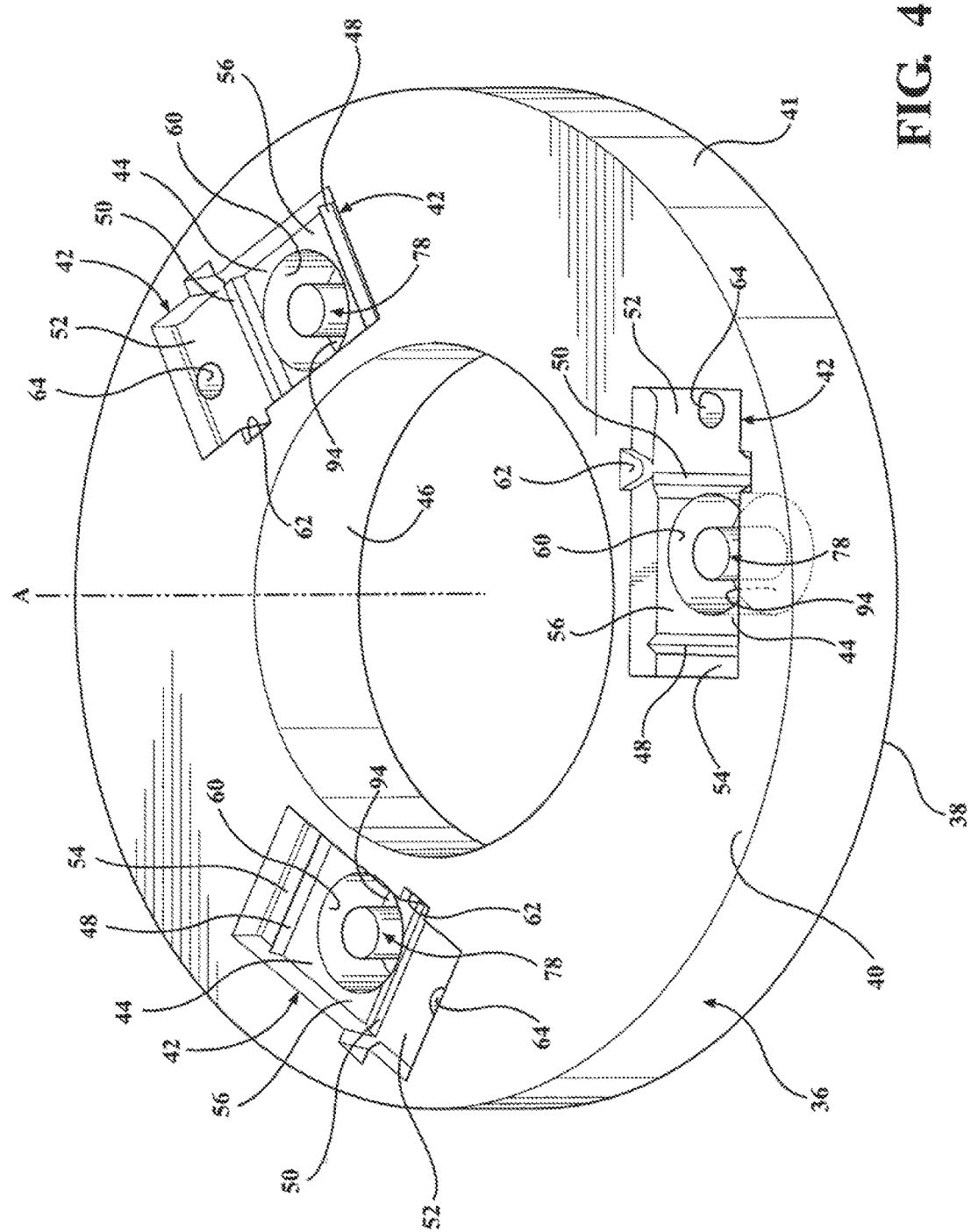
FIG. 4 is a perspective view of the pocket plate having a plurality of a first preferred embodiment of compartments extending axially inwardly from an inside surface.
Figure 5:
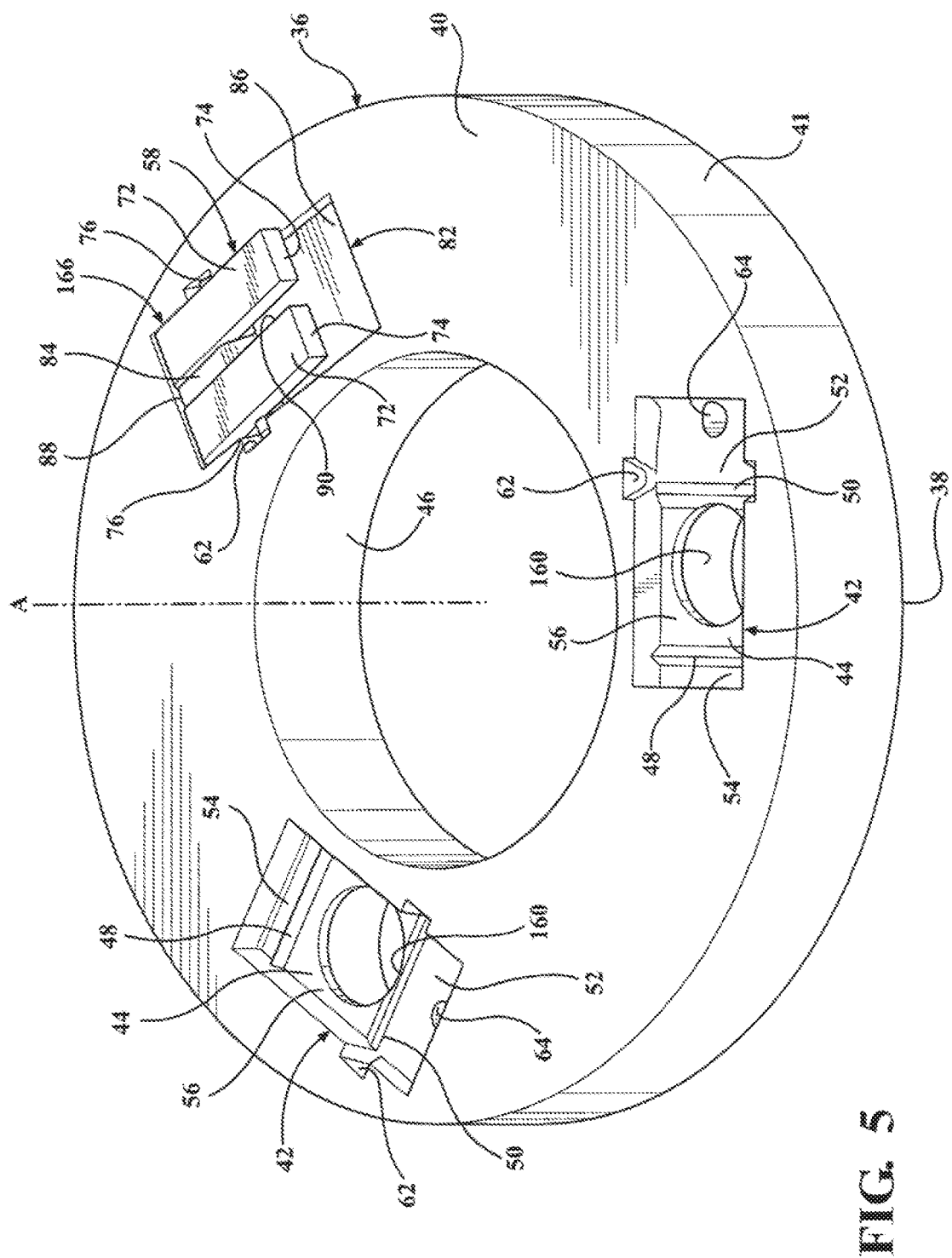
FIG. 5 is a perspective view of the pocket plate having a plurality of a second preferred embodiment of compartments extending axially from the planar face surface and each defining a coil chamber for receipt of a coil assembly associated with each of the electromagnetic actuator units.

As best presented in FIGS. 4 and 5, the pocket plate 36 has a generally cylindrical-shape and extends along the axis A between a planar outer surface 38 and a planar inner surface 40. An edge wall 41 extends between the outer and inner surfaces 38, 40. The inner surface 40 is axially aligned with the ratchet surface 26 of the lock plate 22. The pocket plate 36 also defines a passage 46 that has a circular-shaped cross-section that extends through the pocket plate 36 between the outer and inner surfaces 38, 40 in coaxial alignment with the hole 30 of the lock plate 22. While not shown, the edge wall 41 of pocket plate 36 may include external splines while the inside wall 31 of the lock plate 22 may include internal splines (like those presented in FIG. 1).

The inner surface 40 of the pocket plate 36 defines a plurality of compartments 42 that each have a generally rectangular-shaped cross-section and extend axially into the pocket plate 36 to a lower surface 44. The compartments 42 are equally circumferentially spaced about the passage 46 from one another. In the preferred embodiments shown in FIGS. 4 and 5, three compartments 42 are defined by the pocket plate 36, however, more or fewer compartments 42 could alternatively be utilized based on the specific size and torque-carrying characteristics of the one-way clutch apparatus 20. Furthermore, the compartments 42 could have other shapes, e.g., an oval shaped cross-section, without departing from the scope of the subject disclosure.

A pivot rail 48 and a ledge 50 each extend upwardly from the lower surface 44 of each of the compartments 42 in spaced relationship with one another. A coil chamber 60, 160, 260 is defined by the lower surface 44 of each of the compartments 42. Further a pair of slots 62 that each have a semi-circular cross-section are defined by the pocket plate 36, 136, 236 on opposing sides of the strut section 52 of each of the compartments 42. Furthermore, the lower surface 44 of each of the compartments 42 defines a spring orifice 64. The compartments 42 we each divided into a strut section 52 which extends along the ledge 58 and includes the pair of slots 62 and spring orifice 64, an armature section 54 which includes the pivot rail 48, and a core section 56 that includes the coil chamber 60, 160, 260. The core section 56 is disposed between the strut and armature sections 52, 54.

Each of the compartments 42 are configured to receive an electromagnetic actuator unit 66, 166, 266 that includes a strut 58 (locking member), a coil assembly 77, 177, 277 (bobbin assembly) installed in the coil chamber 60, 160, 260, an armature assembly 82, 282, and a biasing spring 68.

The strut 58 of each of the electromagnetic actuator units 66, 166, 266 is disposed in the compartment 42 and is pivotally connected to the pocket plate 36, 136, 236 in the strut section 52 for pivoting toward and away from the locking teeth 32 between a locked position and a released position in conjunction with pivotal movement of armature fingers 84, 284 of the armature assembly 82, 282 between energized/actuated and non-energized/non-actuated positions relative to the coil assembly 77. Further, the biasing spring 68 extends between the lower surface 44 in the spring orifice 64 and the strut 58 for biasing the strut 58 in the locked position.

Figure 7:
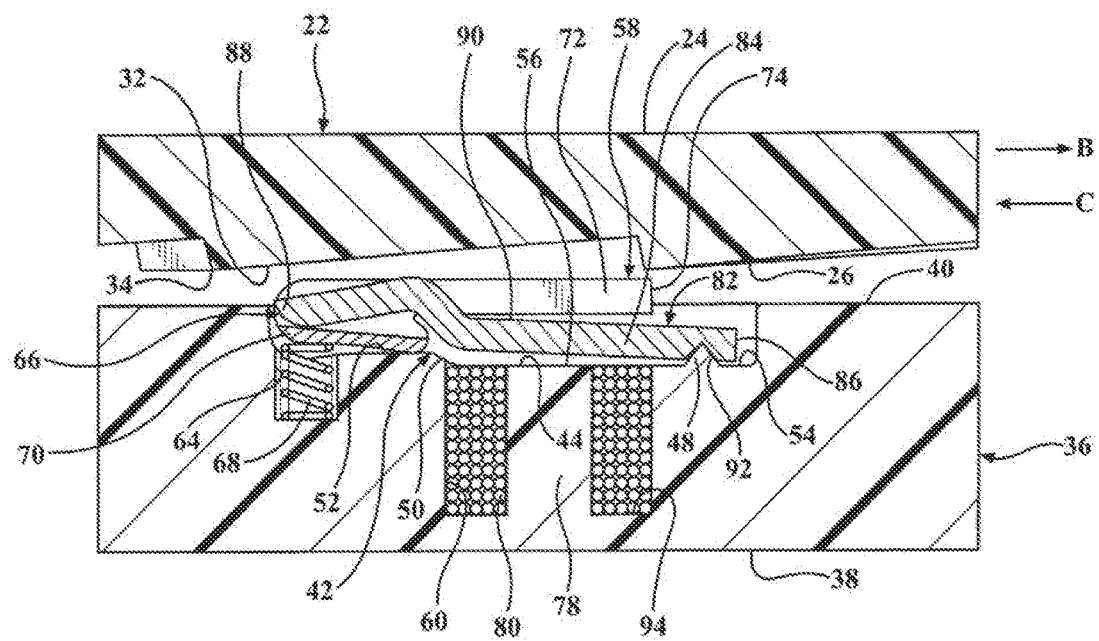
FIG. 7 is a sectional view of an axial-type selectable one-way clutch having the pocket plate of FIG. 4 illustrating a strut pivoted in its released position.
Figure 8:
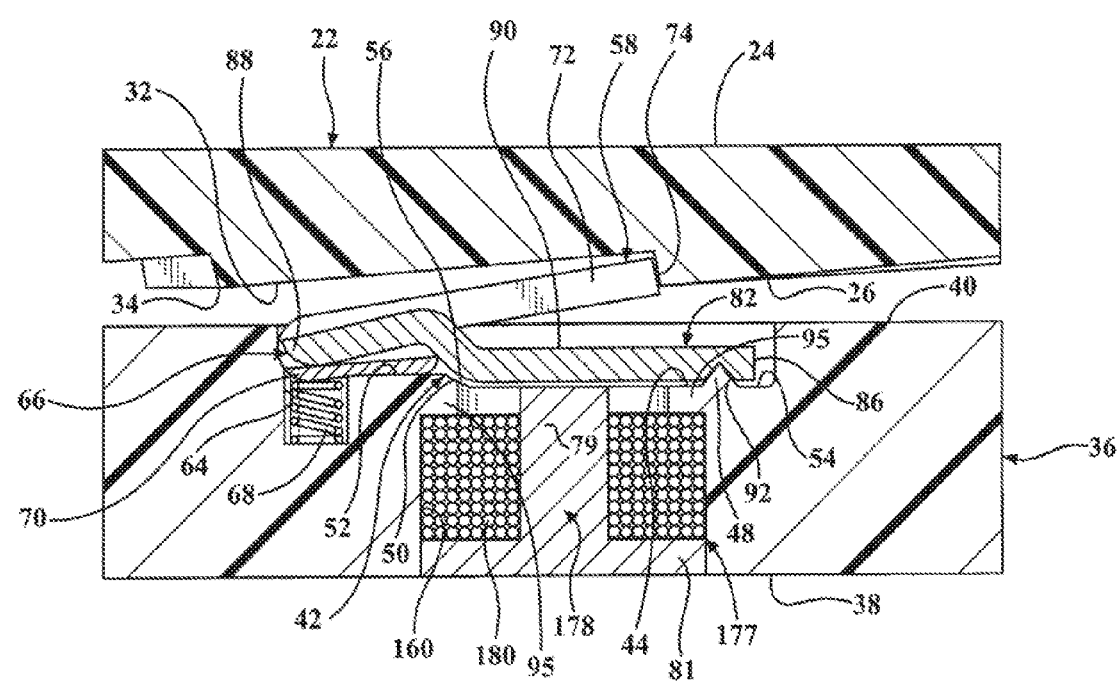
FIG. 8 is similar to FIG. 6 except that the axial type selectable one-way clutch is equipped with the pocket plate of FIG. 5.

FIG. 7 illustrates an actuated condition of the first preferred embodiment of the actuator unit 66, wherein energization of coil assembly 77 results in pivotal movement of the armature finger 84 to its energized/actuated position which, in turn, forcibly pivots the strut 58 into its locked position in opposition of the biasing force of spring 68, and engagement with the shoulder 34 of one of the teeth 32. In this arrangement, rotation of lock plate 22 in a first direction (Arrow "B") relative to pocket plate 36 is permitted ("free-wheel mode") while in a second direction (Arrow "C") relative to pocket plate 36 is inhibited ("locked mode"). In contrast, FIG. 8 illustrates the non-energized mode of actuator unit 66 which permits the spring 68 to urge strut 58 to its released position, spaced from the teeth 32, and armature fingers 84 to its non-actuated position. In this arrangement, rotation of lock plate 22 relative to pocket plate 36 is permitted in both directions (Arrow B and Arrow C) to provide a bi-directional free-wheeling mode.

As best presented in FIGS. 5 and 6-8, the strut 58 further includes a base segment 70 and a pair of locking arms 72 that extend from the base segment 70 in spaced and parallel relationship with one another. Each of the locking arms 72 terminate at a lock edge 74 for engaging the shoulder 34 of the ramp when the strut 58 is in the locked position. The strut 58 further includes a pair of pivot posts 76 that each extends perpendicularly from one of the locking arms 72 and are received by one of the slots 62 for providing pivoting movement of the strut 58 about the pivot posts 76 between the locked and released positions. The base segment 79 is disposed in the strut section 52 of the compartment 42 and is engaged by the biasing spring 68 for biasing the strut 58 in the unlocked position.

As best shown in FIGS. 6-8 and 10, the coil assembly 77, 177, 277 of each of the electromagnetic actuator units 66, 166, 266 includes a core 78, 178 of a magnetically permeable material that is disposed in the coil chamber 60, 160, 260. Furthermore, each of the coil assemblies 77, 177, 277 includes at least one coil 80, 180, 280 that is disposed in the coil chamber 60, 160, 260 and wrapped about the core 78, 178 for focusing the magnetic flux produced by the coil 88, 180, 280 on the core 78, 178 for drawing the armature finger 84, 284 toward the core 78, 178 in response to energization of the coil 80, 180, 280. Each of the coils 80, 180, 280 are energizeable between an energized state and a non-energized state. A power source (not shown) is electrically connected to the coil 80, 186, 288 for energizing the coil 80, 180, 280.

Each armature assembly 82, 282 has at least one armature finger 84, 284 that is disposed adjacent to the coil 80, 180, 280 and moveable between an actuated position and a non-actuated position. Each of the armature fingers 84, 284 extends between a first end 86 that is seated in the armature section 54 and a second end 88 that is disposed in the strut section 52. Each armature linger 84, 284 further has an intermediate section 90 that is positioned between the first and second ends 86, 88 in overlying relationship with the core section 56 of the compartment 42 such that the armature fingers 84, 284 are drawn toward the core section 56 in response to energization of the coil 186, 280. Each of the armature fingers 84, 284 are pivotal at the first end 86 toward and away from the lower surface 44 between the actuated and non-actuated positions. Furthermore, as mentioned above, each of the armature fingers 84, 284 engages one of the struts 58 for moving the struts 58 into the locked position in response to the armature finger 84, 284 being in the actuated position, and into the released position in response to the armature finger 84, 284 being in the non-actuated position. Further, as best presented in FIG. 5, each of the armature fingers 84, 284 engages the base segment 76 between the pair of the locking arms 72 of the strut 58 for pivoting the strut 58 in response to engagement by the armature.

Figure 6:
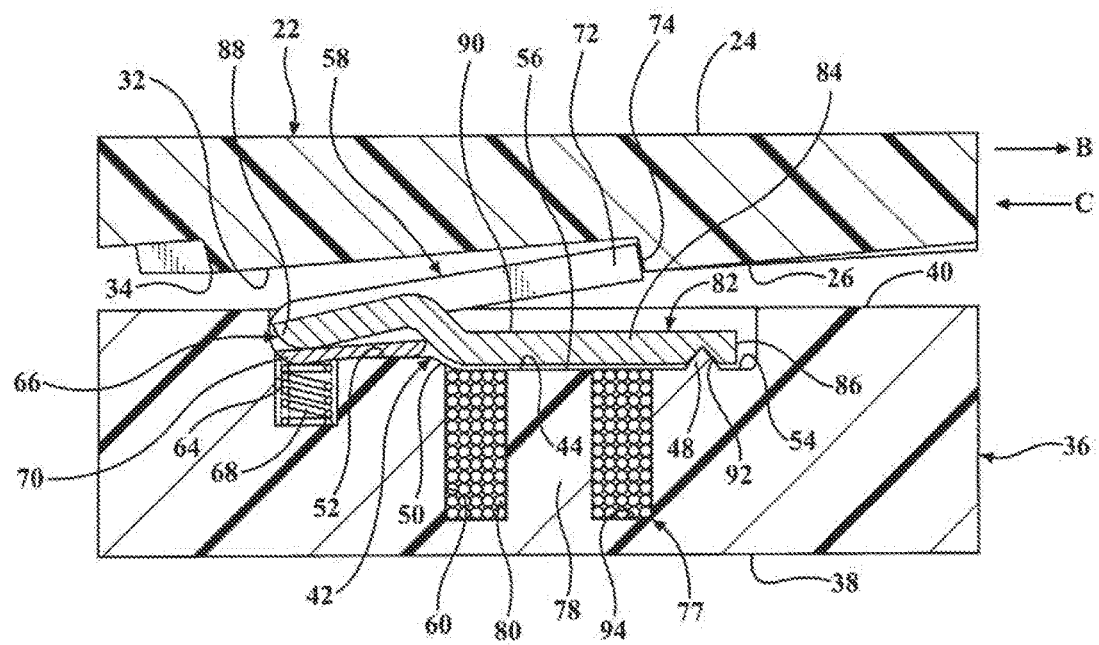
FIG. 6 is a sectional view of an axial-type selectable one-way clutch having the pocket plate of FIG. 4 illustrating a strut pivoted in its locked position.

In the first preferred embodiment of the armature assembly 82 best presented in FIGS. 6-8, each of the armature fingers 84 defines a cut-out 92 adjacent to the first end 86 for receiving the pivot tail 48 for providing pivoting movement about the pivot rail 48 between the actuated and non-actuated positions.

In a first preferred embodiment of the coil chambers 60 and coil assemblies 77 as best presented FIGS. 4 and 6-7, each of the coil chambers 60 terminate at a platform 94 adjacent to the outer surface 38 of the pocket plate 36. Furthermore, a cylindrical-shaped core 78 extends from each of the platforms 94 in the coil chamber 60. The platform 94 is integral with the pocket plate 36, and the core 78 is integral with the platform 94. The coil 80 is wrapped about the core. Thus, the integral core 78 formed in pocket plate 36 facilitates a drop-in installation of the coil 80.

In a second preferred embodiment of the coil chambers 160 and coil assemblies 177 as best shown in FIGS. 5 and 8, each of the coil chambers 160 extend through the pocket plate 136 as a throughbore. Furthermore, each of the cores 178 have a cylindrical-shaped projection portion 79 and a disc portion 81 that is received by one of the coil chambers 160. At least one coil 180 is disposed about each of the cores 78 in the the coil chambers 160 in axial abutment with the disc portion 81. Furthermore, the pocket plate 136 includes an overhang 95 that extends radially inwardly into each coil chamber 166 at the lower surface 44 of the compartment 42. The coil 180 is sandwiched axially between the disc portion 81 of the core 178 and the overhand 95 of the pocket plate 136 for holding the coil 180 in position. Additionally, the disc portion 81 of the core 78 is disposed generally flush with, the outer surface 38 of the pocket plate 136. Accordingly, in the second preferred embodiment, the coil chamber 160 is sized to permit installation of the coil assembly 177, including both the core 178 and the coils 180 as a one-piece unit. This allows the coil assembly 177 to be pre-assembled and installed as a unit. Obviously, the operation of actuator units 66, 166 is practically identical to and will coordinate movement of armature fingers 84 and struts 58 as shown in FIGS. 6-7.

Figure 9:
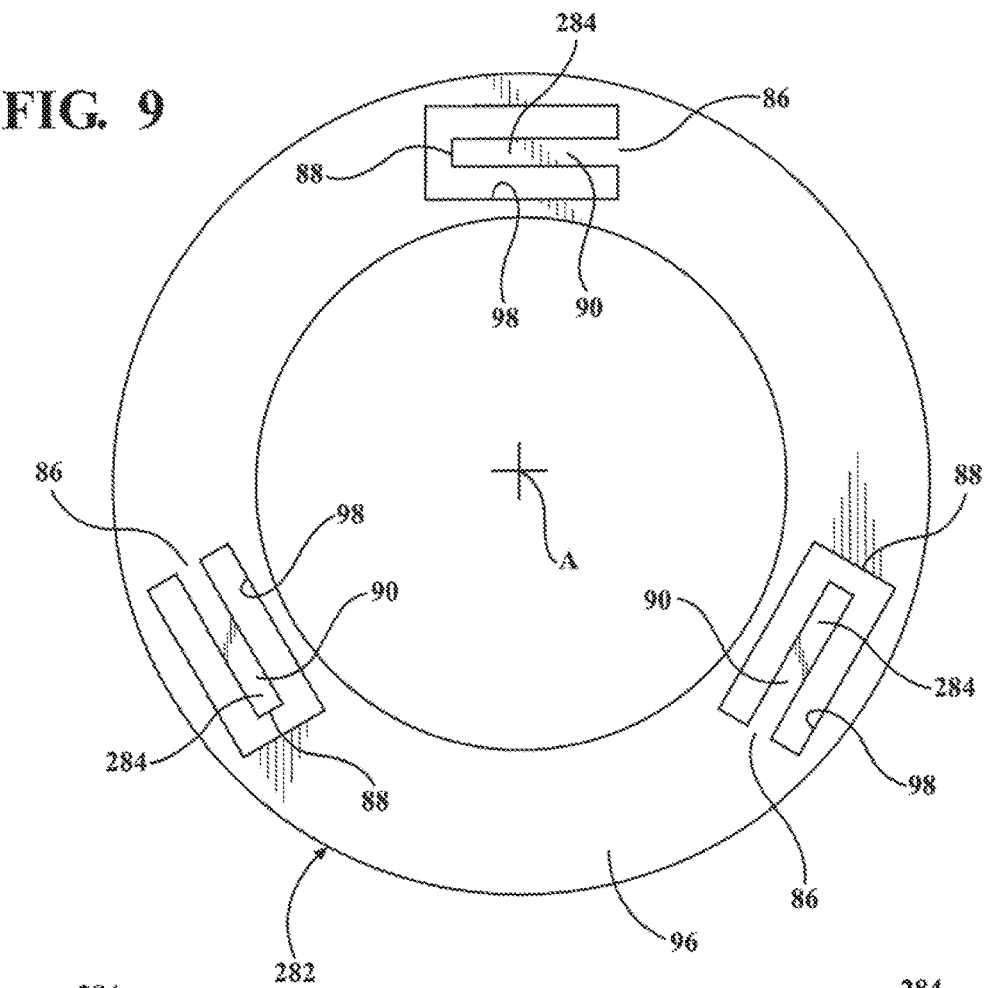
FIG. 9 is a top view of a one-piece common armature plate.

In a third preferred embodiment of the coil chamber 260 and armature assembly 282 best presented in FIGS. 9-10, the coil chamber 260 extends annularly about the passage 46 of the pocket plate 236. At least one coil 280 is disposed in the coil chamber 260 that extends annularly and continuously about the passage 46 of the pocket plate 236. The armature assembly 282 further includes a common armature plate 96 that has a ring-shape and is disposed in overlying relationship over the pocket plate 236. The common armature plate 96 defines a plurality of cutouts 98 that are each in alignment with one of the compartments 42. The armature fingers 284 each are resiliency connected to and extend from the common armature plate 96 into one of the cutouts 98. The armature fingers 284 are adapted to reliantly pivot at their first end 86 at the common armature plate 96 between the actuated and non-actuated positions in response to energization and de-energization of the coil, causing the strut 58 to pivot from its released position into its locked position. Upon de-energization of the coil assembly 277, the spring 68 will forcibly cause each strut 58 to return to its released position which, in turn, causes the armature fingers 284 to move back to their non-activated position. The third preferred embodiment therefore actuates similarly to the first and second preferred embodiments, and as an option, the first and second preferred embodiments of the coil assemblies 77, 177 can be used in coordination with the common armature plate 96 of the third preferred embodiment.

Referring to FIG. 11, an exemplary arrangement for a selectable one-way clutch 320 within an automatic transmission 300 is shown. Transmission 300 includes a housing 362 rotatably supporting a shaft (not shown). A planetary gear set (not shown) is coupled with the shaft. A clutch pack 322 is disposed between a hub 324 extending from a carrier ring (not shown) of the planetary gear set and the housing 302. A hydraulic clutch actuator (not shown) is provided for applying a clutch engagement force on clutch pack 322. Selectable one-way clutch 320 is shown with external splines 326 of pocket plate 336 meshed with internal splines 328 on housing 302, while internal splines 330 of lock plate 322 are meshed with external splines 332 on hub 324. In the configuration shown, the selectable one-way clutch 320 is operable to permit the planet carrier to free-wheel in both directions relative to housing 300 when the electromagnetic clutch actuator units (not shown) within pocket plate 336 are non-actuated. However, upon actuation of the electromagnetic clutch actuator units, carrier 320 is braked against rotation. FIG. 11 is merely on exemplary application of selectable one-way clutch 20 in an automatic-transmission.

This disclosure provides details of only a few electromagnetic actuators suitable for use in axial type selectable one-way clutches. To this end, commonly owned and copending U.S. application Ser. No. 13/838,336 filed Mar. 15, 2013 and entitled "electric Actuator Module for Selectable One-way Clutch" describes alternative electromagnetic actuators such feat the entire disclosure of the above noted application is incorporated by reference herein. Also incorporated herein are commonly-owned U.S. Provisional Application No. 61/859,514 filed Jul. 29, 2013 and U.S. Provisional Application No. 61/866,755 filed Aug. 16, 2013, both of which disclose alternative electromagnetic clutch actuators capable of use with the axial type selectable one-way clutch disclosed in this application.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

What is claimed is:

1. A selectable one-way clutch apparatus, comprising:

a first plate extending along an axis and having an inner surface defining at least one compartment;

a second plate having a ratchet surface being aligned axially adjacent with said inner surface of said first plate and presenting a plurality of teeth;

each of said compartments divided into a strut section, an armature section and a core section with said core section disposed between said strut and armature sections; and at least one electromagnetic actuator unit received by said compartment, said electromagnetic actuator unit including at least one coil assembly disposed in said core section, at least one armature assembly having at least one armature finger pivotally moveable in said armature section and extending over said coil section for movement toward and away from said coil assembly in response to said coil assembly being energized, and at least one strut being pivotally moveable in said strut section for moving in response to engagement by said armature finger between a locked position in engagement with one of said teeth and a released position displaced from engagement with said teeth, wherein said first plate defines a coil chamber extending axially into said first plate in said core section of said compartment and receiving said coil assembly, said coil assembly including a core disposed in said coil chamber and a coil disposed about said core for focusing a magnetic flux produced by said coil on said core to draw said armature finger toward said core when said coil is energized, wherein said coil chamber extends axially through said first plate, said core of said coil assembly includes a disc portion received by said coil chamber and a projection portion extending from said disc portion with said coil wrapped about said projection portion and axially abutting said disc portion, and wherein said first plate includes an overhang extending radially inwardly into said coil chamber at said lower surface of said compartment, said coil is sandwiched axially between said disc portion of said core and said overhang of said first plate for holding said coil in position.

2. The selectable one-way clutch apparatus as set forth in claim 1 wherein said at least one compartment includes a plurality of compartments disposed about said first plate and said at least one electromagnet actuator unit includes a plurality of electromagnet actuator units each disposed in one of said compartments.

3. The selectable one-way clutch apparatus as set forth in claim 1 and further including a platform integrally connected with said first plate closing said coil chamber adjacent to said outer surface of said first plate, wherein said core of said coil assembly is integrally connected with and extending from said platform in said coil chamber.

4. The selectable one-way clutch apparatus as set forth in claim 1 wherein said first plate further defines an outer surface extending in generally spaced and parallel relationship with said inside surface, said disc portion of said core is disposed generally flush with said outer surface of said first plate.

5. The selectable one-way clutch apparatus as set forth in claim 1 wherein said coil chamber extends annularly and continuously about said first plate.

6. The selectable one-way clutch apparatus as set forth in claim 5 wherein said first plate defines a hole extending axially therethrough, said coil chamber extends annularly about said hole of said first plate, said coil is disposed in said coil chamber and extends annularly and continuously about said hole of said first plate.

7. A selectable one-way clutch apparatus, comprising:
a first plate extending along an axis and having an inner surface defining at least one compartment;
a second plate having a ratchet surface being aligned axially adjacent with said inner surface of said first plate and presenting a plurality of teeth;
each of said compartments divided into a strut section, an armature section and a core section with said core section disposed between said strut and armature sections; and
at least one electromagnetic actuator unit received by said compartment, said electromagnetic actuator unit including at least one coil assembly disposed in said core section, at least one armature assembly having at least one armature finger pivotally moveable in said armature section and extending over said coil section for movement toward and away from said coil assembly in response to said coil assembly being energized, and at least one strut being pivotally moveable in said strut section for moving in response to engagement by said armature finger between a locked position in engagement with one of said teeth and a released position displaced from engagement with said teeth,
wherein said first plate presents a lower surface in said compartment, a pivot rail and a ledge each extend upwardly from said lower surface in said compartment in spaced relationship with one another, and
wherein said strut includes a base segment and a pair of locking arms extending from said base segment in spaced and parallel relationship with one another and terminating at a locking edge for engaging said teeth of said second plate when said strut is in said locked position.

8. The selectable one-way clutch apparatus as set forth in claim 7 wherein said first plate defines a pair of slots on opposing sides of said strut section of said compartment, a pair of pivot posts each extend outwardly from one of said locking arms and are received by one of said slots for pivoting said strut about said pivot post between said locked and released positions, said strut engages said armature finger in said strut section of said compartment.

9. The selectable one-way clutch apparatus as set forth in claim 8 wherein a spring extends between said lower surface in said strut section of said compartment and said base of said strut for biasing said strut in said locked position.

10. The selectable one-way clutch apparatus as set forth in claim 9 wherein said first plate defines a spring orifice on said lower surface in said strut section for receiving said spring.

11. The selectable one-way clutch apparatus as set forth in claim 10 wherein said strut section extends along said ledge and includes said pair of slots and said spring orifice, said armature section includes said pivot rail, and said core section includes said coil chamber.

12. The selectable one-way clutch apparatus as set forth in claim 8 wherein said armature finger extends between a first end pivotally disposed in said armature section and a second end disposed in said strut section in engagement with said strut and having an intermediate portion between said first and second ends and overlying said core section of said compartment.

* * * * *

UNITED STATES PATENT AND TRADEMARK OFFICE
CERTIFICATE OF CORRECTION

PATENT NO. : 10,066,679 B2
APPLICATION NO. : 15/115972
DATED : September 4, 2018
INVENTOR(S) : Adrian C. Cioc et al.

Page 1 of 1

It is certified that error appears in the above-identified patent and that said Letters Patent is hereby corrected as shown below:

In Column 1, Line 34, please change "an" to --on--.
In Column 2, Line 34, please change "m" to --in--.
In Column 3, Line 41, please change "pro vide" to --provide--.
In Column 4, Line 24, please change "axe" to --are--.
In Column 4, Line 39, please change "If" to --It--.
In Column 4, Line 50, please change "26," to --26.--.
In Column 5, Line 27, please change "42 we" to --42 are--.
In Column 5, Line 28, please change "ledge 58" to --ledge 50--.
In Column 6, Line 11, please change "base segment 79" to --base segment 70--.
In Column 6, Line 22, please change "coil 88" to --coil 80--.
In Column 6, Line 28, please change "coil 80, 186, 288" to --coil 80, 180, 280--.
In Column 6, Line 35, please change "linger" to --finger--.
In Column 6, Line 40, please change "coil 186, 280" to --coil 80, 180, 280--.
In Column 6, Line 50, please change "base segment 79" to --base segment 70--.
In Column 6, Line 57, please change "pivot tail 48" to --pivot rail 48--.
In Column 7, Line 13, please change "chamber 166" to --chamber 160--.
In Column 7, Line 38, please change "resiliency" to --resiliently--.
In Column 7, Line 57, please change "362" to --302--.
In Column 8, Line 14, please change "feat" to --that--.

Signed and Sealed this
Eleventh Day of December, 2018

Andrei Iancu
*Director of the United States Patent and Trademark Office*